(12) United States Patent
Dolog et al.

(10) Patent No.: US 12,258,822 B2
(45) Date of Patent: Mar. 25, 2025

(54) ENCAPSULATED LOST CIRCULATION MATERIALS BASED ON SWELLABLE ELASTOMERS

(71) Applicant: Baker Hughes Oilfield Operations LLC, Houston, TX (US)

(72) Inventors: Rostyslav Dolog, Houston, TX (US); Qusai A. Darugar, Houston, TX (US); Radhika Suresh, Sugar Land, TX (US); Oleg Mazyar, Katy, TX (US)

(*) Notice: Subject to any disclaimer, the term of this patent is extended or adjusted under 35 U.S.C. 154(b) by 0 days.

(21) Appl. No.: 18/449,389

(22) Filed: Aug. 14, 2023

(65) Prior Publication Data

US 2025/0059838 A1  Feb. 20, 2025

(51) Int. Cl.
| | | |
|---|---|---|
| C09K 8/516 | (2006.01) | |
| C09K 8/035 | (2006.01) | |
| E21B 21/00 | (2006.01) | |

(52) U.S. Cl.
CPC ............ *E21B 21/003* (2013.01); *C09K 8/035* (2013.01); *C09K 8/516* (2013.01)

(58) Field of Classification Search
None
See application file for complete search history.

(56) References Cited

U.S. PATENT DOCUMENTS

| | | |
|---|---|---|
| 4,036,301 A | 7/1977 | Powers et al. |
| 4,269,279 A | 5/1981 | House |
| 4,391,925 A | 7/1983 | Mintz et al. |
| 4,614,599 A | 9/1986 | Walker |
| 4,664,816 A | 5/1987 | Walker |
| 5,102,559 A | 4/1992 | McDougall et al. |
| 6,528,157 B1 | 3/2003 | Hussain et al. |
| 6,581,701 B2 | 6/2003 | Heying |
| 7,036,856 B2 | 5/2006 | Fishencord |
| 7,343,985 B1 | 3/2008 | Gregg |

(Continued)

FOREIGN PATENT DOCUMENTS

| | | |
|---|---|---|
| CN | 109517588 A | 3/2019 |
| CN | 110591676 A | 12/2019 |

(Continued)

OTHER PUBLICATIONS

Cabeza et al., "Evaluation of volume change in phase change materials during their phase transition"; Journal of Energy Storage 28 (2020); Jan. 14, 2020; 4 pages.

(Continued)

*Primary Examiner* — Andrew Sue-Ako
(74) *Attorney, Agent, or Firm* — Baker Hughes Company (57) ABSTRACT

A method of reducing lost circulation includes introducing into a subsurface formation a wellbore fluid containing an encapsulated lost circulation material having a core including an elastomer and a disintegrating agent, and the disintegrating agent including at least one of the phase change material or a gas-producing material, and a shell encapsulating the core; heating the disintegrating agent to cause the phase change material to expand, or to cause the gas-producing material to produce a gas, or a combination thereof to break the shell; and releasing the elastomer from the encapsulated lost circulation material; expanding the elastomer; and filling a void or fracture of the subsurface formation with the expanded elastomer to reduce fluid loss.

10 Claims, 3 Drawing Sheets

(56) References Cited

U.S. PATENT DOCUMENTS

| | | | |
|---|---|---|---|
| 7,559,369 | B2 | 7/2009 | Roddy et al. |
| 7,629,297 | B2 | 12/2009 | Shaarpour |
| 7,703,521 | B2 | 4/2010 | Sullivan et al. |
| 7,784,542 | B2 | 8/2010 | Roddy et al. |
| 7,784,566 | B2 | 8/2010 | Gregg |
| 7,806,183 | B2 | 10/2010 | Roddy et al. |
| 7,892,352 | B2 | 2/2011 | Roddy et al. |
| 8,574,667 | B2 | 11/2013 | John et al. |
| 8,586,512 | B2 | 11/2013 | Roddy et al. |
| 8,592,353 | B2 | 11/2013 | Dalrymple et al. |
| 8,598,093 | B2 | 12/2013 | Roddy et al. |
| 8,603,952 | B2 | 12/2013 | Roddy et al. |
| 8,689,869 | B2 | 4/2014 | Shindgikar et al. |
| 8,815,135 | B2 | 8/2014 | Beecher et al. |
| 9,090,812 | B2 | 7/2015 | Gerrard et al. |
| 9,206,344 | B2 | 12/2015 | Roddy et al. |
| 9,238,771 | B1 | 1/2016 | Mahmoud |
| 9,321,956 | B2 | 4/2016 | Nguyen et al. |
| 9,416,050 | B2 | 8/2016 | Seidl et al. |
| 9,546,315 | B2 | 1/2017 | Pollard et al. |
| 9,587,163 | B2 | 3/2017 | Gaudette et al. |
| 9,702,217 | B2 | 7/2017 | Dolog et al. |
| 9,765,252 | B2 | 9/2017 | Roddy et al. |
| 10,060,205 | B2 | 8/2018 | De Stefano et al. |
| 10,081,756 | B1 | 9/2018 | Reddy et al. |
| 10,160,896 | B2 | 12/2018 | Weaver et al. |
| 10,385,647 | B2 | 8/2019 | Gozalo et al. |
| 10,590,338 | B2 | 3/2020 | Hall et al. |
| 10,718,883 | B2 | 7/2020 | Galliano et al. |
| 11,008,839 | B2 | 5/2021 | Collier et al. |
| 2008/0087431 | A1 | 4/2008 | Willauer et al. |
| 2009/0084539 | A1 | 4/2009 | Duan et al. |
| 2011/0067872 | A1 | 3/2011 | Agrawal |
| 2011/0088901 | A1 | 4/2011 | Watters et al. |
| 2011/0252781 | A1 | 10/2011 | Johnson et al. |
| 2012/0175118 | A1 | 7/2012 | Khatri et al. |
| 2012/0190593 | A1 | 7/2012 | Soane et al. |
| 2012/0208726 | A1 | 8/2012 | Smith et al. |
| 2013/0126164 | A1 | 5/2013 | Sweatman et al. |
| 2013/0146312 | A1 | 6/2013 | Gerrard et al. |
| 2014/0262529 | A1 | 9/2014 | Quintero et al. |
| 2014/0345878 | A1* | 11/2014 | Murphree ............... E21B 34/14 166/377 |
| 2015/0060072 | A1 | 3/2015 | Busby et al. |
| 2015/0240609 | A1 | 8/2015 | Lucas et al. |
| 2016/0312098 | A1 | 10/2016 | Savari et al. |
| 2016/0326829 | A1 | 11/2016 | Dolog et al. |
| 2017/0002257 | A1 | 1/2017 | Pisklak et al. |
| 2017/0015824 | A1 | 1/2017 | Gozalo et al. |
| 2018/0037803 | A1* | 2/2018 | Dahi Taleghani .... E21B 43/267 |
| 2018/0149008 | A1* | 5/2018 | Nguyen ................ C09K 8/685 |
| 2018/0258340 | A1 | 9/2018 | Rothrock et al. |
| 2019/0375978 | A1 | 12/2019 | Shojaei et al. |
| 2020/0181475 | A1 | 6/2020 | Dighe et al. |
| 2020/0299202 | A1* | 9/2020 | Choi ................... C04B 20/1074 |
| 2020/0354622 | A1 | 11/2020 | Sherman et al. |
| 2020/0362220 | A1 | 11/2020 | Musso et al. |
| 2021/0172303 | A1 | 6/2021 | Musso et al. |
| 2023/0167721 | A1 | 6/2023 | Palisch et al. |
| 2023/0340854 | A1* | 10/2023 | Fripp ................... E21B 33/1208 |

FOREIGN PATENT DOCUMENTS

| | | |
|---|---|---|
| CN | 111303847 A | 6/2020 |
| KR | 20190036399 A | 4/2019 |
| WO | 03044317 A1 | 5/2003 |
| WO | 2009106796 A1 | 9/2009 |
| WO | 2014092888 A1 | 6/2014 |

OTHER PUBLICATIONS

Da Cunha et al., "Thermal energy storage for low and medium temperature applications using phase change materials—A review"; Applied Energy 177 (2016); May 24, 2016; 12 pages.

Farley et al., "Field Test of a Self-Conforming Oil Recovery Fluid"; Journal of Petroleum Technology; Nov. 1, 1976; 7 pages.

Frampton, et al., "Development Of A Novel Waterflood Conformance Control System"; SPE/DOE Symposium, Tulsa OK, Apr. 2004; Paper No. SPE-89391-MS; 7 pages.

Garmeh et al., "Thermally Active Polymer To Improve Sweep Efficiency of Waterfloods: Simulation and Pilot Design Approaches"; SPE Paper No. 144234; Jul. 19, 2011; 13 pages.

Himes, et al., Reversible, Crosslinkable Polymer for Fluid-Loss Control; Society of Petroleum Engineers, SPE Paper No. 27373; Feb. 7, 1994; 2 pages.

Jankowski et al., "A review of phase change materials for vehicle component thermal buffering"; Applied Energy 113 (2014); Oct. 4, 2013; 37 pages.

Kahar et al., "The Versatility of Polymeric Materials as Self-Healing Agents for Various Types of Applications: A Review"; Polymers 2021, 13, 1194; 34 pages.

Kenisarin, "High-temperature phase change materials for thermal energy storage"; Renewable and Sustainable Energy Reviews 14 (2010); Oct. 28, 2009; 16 pages.

Korojy, "Volume Change Effects during Solidification of Alloys"; Royal Institute of Technology; Doctoral Thesis; Jun. 2009; 58 pages.

Li, et al., "Study of solid+solid phase change of (n-CnH21NH3)2MCl4 for thermal energy storage"; Thermochimica Acta 326 (1999); 4 pages.

Maffeis et al., Application of Thermally Activated Polymers in a Mature Oil Field: Candidates Selection, Field Implementation and Preliminary Results: Offshore Mediterranean Conference; Mar. 2017; 6 pages.

Magzoub, M. et al. "Loss Circulation Prevention in Geothermal Drilling by Shape Memory Polymer" Elsevier, Geothermics, vol. 89, Jan. 2021, 101943, 7 pages.

Mansour, Ahmed et al., "Smart Expandable LCMs—A Theoretical and Experimental Study;" American Association of Drilling Engineers; Apr. 11, 2017; 7 pages.

Mansour, Ahmed et al., "Smart lost circulation materials for productive zones;" Journal of Petroleum Exploration and Production Technology; May 2, 2018; 16 pages.

Peng, et al.; "Phase Change Material (PCM) Microcapsules for Thermal Energy Storage"; Advances in Polymer Technology; vol. 2020, Article ID 9490873; 20 pages; Jan. 12, 2020.

Pereira et al., "Polymers as Encapsulating Agents and Delivery Vehicles of Enzymes"; Polymers 2021, 13, 4061; Nov. 21, 2021; 28 pages.

Rogers et al., "New Equipment Designs Enable Swellable Technology in Cementless Completions"; IADC/SPE Drilling Conference; Mar. 4, 2008.

Savari et al., "Lost Circulation Management in Naturally Fractured Formations: Efficient Operational Strategies and Novel Solutions": IADC/SPE Drilling Conference and Exhibition; Mar. 1, 2016.

Savari et al., "Lost Circulation Management in Naturally Fractured Reservoirs"; SPE/IADC Middle East; Jan. 2016; 6 pages.

Zhong et al., "Mitigation of Lost Circulation in Oil-Based Drilling Fluids Using Oil Absorbent Polymers;" Materials; Oct. 18, 2019; 20 pages.

International Search Report and Written Opinion for International Application No. PCT/US2024/041891, International Filing Date Aug. 12, 2024, Date of Mailing Nov. 27, 2024, 10 pages.

International Search Report and Written Opinion for International Application No. PCT/US2024/041892, International Filing Date Aug. 12, 2024, Date of Mailing Nov. 22, 2024, 9 pages.

International Search Report and Written Opinion for International Application No. PCT/US2024/041894, International Filing Date Aug. 12, 2024, Date of Mailing Nov. 26, 2024, 12 pages.

Notification of Transmittal of the International Search Report and the Written Opinion of the International Searching Authority, or the Declaration; PCT/US2024/041898; Mail date Nov. 19, 2024; 10 pages.

* cited by examiner

ENCAPSULATED LOST CIRCULATION MATERIALS BASED ON SWELLABLE ELASTOMERS

BACKGROUND

Loss of circulation is the uncontrolled flow of a fluid into a formation. It can be encountered during any stage of well operations. Lost circulation can result in increased cost of the well through increased material costs to replace the lost fluids, and the downtime to remediate the lost circulation zones.

Lost circulation zones may be remediated by introducing a lost circulation material (LCM) to seal off the lost circulation zones to prevent further fluid loss. Conventional LCMs can include bridging materials, fibrous materials, flaky materials, cements, and other materials having different particle sizes.

Currently LCMs are directly pumped into the target application area and are prone to losses due to adsorption on the surfaces of the pipes and casings as well as losses due to unwanted reactions with the components of environment. Thus, methods that can reliably deliver the LCMs to the desired location will be appreciated in the industry.

SUMMARY

An encapsulated lost circulation material contains a particulate having a core including an elastomer and a disintegrating agent, and the disintegrating agent including at least one of a phase change material or a gas-producing material; and a shell encapsulating the core.

A method of reducing lost circulation includes introducing into a subsurface formation a wellbore fluid containing an encapsulated lost circulation material having a core including an elastomer and a disintegrating agent, and the disintegrating agent including at least one of the phase change material or a gas-producing material, and a shell encapsulating the core; heating the disintegrating agent to cause the phase change material to expand, or to cause the gas-producing material to produce a gas, or a combination thereof to break the shell; and releasing the elastomer from the encapsulated lost circulation material; expanding the elastomer; and filling a void or fracture of the subsurface formation with the expanded elastomer to reduce fluid loss.

BRIEF DESCRIPTION OF THE DRAWINGS

The following descriptions should not be considered limiting in any way. With reference to the accompanying drawings, like elements are numbered alike.

DETAILED DESCRIPTION

Described are encapsulated lost circulation materials (composites) containing a shell protecting an elastomer core. The core-shell composites also contain a disintegrating agent capable of exerting pressure on the shell from within the composites when triggered thereby breaking the shell and releasing the elastomer to the desired location. The released elastomer can then expand and fill in the voids or fractures in formation to reduce fluid loss.

Using a protective shell can reduce the premature expansion of the elastomer. Moreover, the elastomer can be released when needed since the disintegration of the shell can be triggered on demand.

As used herein, the elastomer can be a crosslinked rubber, which comprises a base elastomer crosslinked by a crosslinking agent, optionally in the presence of at least one of an accelerator or an activator. The base elastomer can include at least one of an ethylene-propylene-diene monomer rubber (EPDM); a butadiene rubber; a styrene-butadiene rubber (SBR); a natural rubber; an acrylonitrile butadiene rubber; a styrene-butadiene-acrylonitrile resin; a nitrile butadiene rubber (NBR); a hydrogenated nitrile butadiene rubber (HNBR); a carboxylated nitrile butadiene rubber (XNBR); a carboxylated hydrogenated nitrile butadiene rubber (XHNBR); an amidated nitrile butadiene rubber (ANBR); a synthetic polyisoprene rubber; an acrylate-butadiene rubber; a polychloroprene rubber; an acrylate-isoprene rubber; an ethylene-vinyl acetate rubber; a polypropylene oxide rubber; or a polypropylene sulfide rubber; fluorinated polymer rubbers (e.g. FKM), perfluorocarbon rubber (FFKM), or tetrafluoro ethylene propylene rubbers (FEPM, such as AFLAS™ fluoroelastomers available from Asahi Glass Co. Ltd.).

The crosslinking agent can comprise sulfur (elemental sulfur) or sulfur-containing compounds (sulfur donors), bis-phenols, or peroxides. Elemental sulfur can be used in an amount of about 0.5 to about 3.5 parts by weight per 100 parts by weight of the base elastomer. Examples of sulfur donors include tetramethylthiuram disulfide (TMTD), N-oxydiethylene-N'-oxydiethylenethiocarbamylsulfonamide (OTOS), dipentamethylenethiuramtetrasulfide (DPTT), 2-morpholinodithiobenzothiazole (MBSS), dithiomorpholine (DTDM), caprolactam disulfide (CLD), or alkyl phenol disulfide. The sulfur donors can be used in an amount of about 0.5 to about 6 parts by weight per 100 parts by weight of the base elastomer.

Examples of the peroxide include di(2,4-dichlorobenzoyl) peroxide; benzoyl peroxide; 1,1-bis(t-butylperoxy)-3,3,5-trimethyl cyclohexane; t-butyl perbenzoate; dicumyl peroxide (Di-Cup); di(t-butylperoxy) diisopropylbenzene (Vul-Cup); 2,5-dimethyl-2,5-di(t-butylperoxy) hexane; di-t-butyl peroxide; or 2,5-dimethyl-2,5-di(t-butylperoxy) hexyne. The peroxide crosslinking agent can be used in amounts of about 0.1 to about 8 parts, or about 0.5 to 5 parts, or about 0.5 to 3 parts, by weight, per 100 parts by weight of the base elastomer. While the peroxide crosslinking agent leads to formation of desired crosslink formation, the competitive reactions can meantime cause undesired polymer scission or other degradation. The balance can be shifted toward desired crosslinking through the use of coagent compounds. The coagent compounds can include triallyl cyanurate (TAC), triallyl isocyanurate (TAIC), trimethallylisocyanurate (TMAIC), trimethylolpropane triacrylate (TMPTA), trimethylolpropane trimethacrylate (TMPTMA), ethylene glycol dimethacrylate (EGDA), ethylene glycol diacrylate (EGDMA), zinc diacrylate (ZDA), or zinc dimethacrylate (ZDMA). Combinations of the coagent can be used. The amount of the coagent can be 0 to about 20 parts, or about 1 to about 10 parts, or about 2 to about 5 parts, by weight, per 100 parts by weight of the base elastomer. Additionally, bisphenol AF cure system may also be chosen as the curative for some of vinylidene fluoride (VDF) containing the fluororubbers, for example, the type 1 to 4 FKM rubbers. A description of the FKM rubber types can be found in ASTM D1418.

Preferably the elastomer is at least one of EPDM or a crosslinked FEPM.

The core can also include a swellable filler. When the swellable filler is present, the elastomer and swellable filler together can be referred to as a filled elastomer. The swellable filler can be a superabsorbent polymer (SAP), or other organic materials that naturally swell in water or oil at elevated temperatures. The SAP may comprise polyacrylic acid, partially neutralized polyacrylic acid sodium salts, poly(butyl acrylate), crosslinked isoprene-maleic acid salts, starch-polyacrylic acid salts, crosslinked carboxylmethyl celluloses (CMC), cellulose, cellulose nanocrystals, polyvinyl alcohol-acrylic acid salts, poly(ethylene oxide), polyacrylamide, or combinations thereof. Swellable organic acid salts can comprise sodium acetate, sodium formate, sodium acrylate, or combinations thereof. An interpenetrating polymer network (IPN) can be created comprised of the elastomer and water swellable filler.

The elastomer and the swellable filler can have a weight ratio of about 20:1 to about 1:2, preferably about 5:1 to about 1:1, and more preferably about 3:1 to about 3:2.

The disintegrating agent comprises at least one of a phase change material (PCM) or a gas-producing material. As used herein, a PCM is a substance that can have a volumetric expansion at phase transition. Preferably, the PCMs used in the encapsulated lost circulation materials of the disclosure can have a volumetric expansion of at least 3 vol %, at least 5 vol %, or at least 10 vol % during phase transition, each based on the initial volume of the PCMs before expansion or before phase transition. The phase transition temperature of the PCMs can be between about 125° F. (52° C.) and about 1000° F. (538° C.), more specifically between about 125° F. (52° C.) and about 700° F. (371° C.). PCMs with transition temperatures between about 500° F. (260° C.) and about 1000° F. (538° C.) can be activated by applying short term localized magnetic heating that would not negatively affect core matrix material and/or the elastomers and/or the swellable filler if present. Furthermore, magnetic materials that provide heating electromagnetic energy can be coated on PCMs to further localize heat inside an encapsulated lost circulation material to regions with PCMs.

The PCMs can be a variety of different material classes, including inorganic materials such as salts, salt hydrates, metal hydroxides, hydrates of metal hydroxides, metallic compounds, and metal alloys; organic materials such as paraffins, fatty acids, esters, alcohols; and eutectic materials such as inorganic-inorganic eutectic materials, inorganic-organic eutectic materials, and organic-organic eutectic materials.

Inorganic salts can be salts of I, II, III, IV groups that are halides, nitrates, carbonates, nitrites, sulfates, or sulfites. Metal hydroxides can be hydroxides of I, II, III, IV group, preferably hydroxides of metals of groups I and II. Preferably, the PCMs are nitrites, halides, or hydroxides of metals of groups I and II and eutectic mixtures of thereof. Some of the inorganic salts can also make eutectic mixtures with organic materials.

Specific examples of the inorganic salts and their eutectic mixtures include $KNO_3$, $KNO_3$—$NaNO_3$, $Li_2CO_3$—$K_2CO_3$, LiF—NaF—KF—$MgF_2$, LiF—NaF—KF, LiF—KF, $LiKCO_3$, $LiNO_3$, $LiNO_3$—$NaNO_3$, $NaNO_2$, and $NaNO_3$.

Examples of organic PCMs include paraffines such as RT-58, high density polyethylene (HDPE), d-mannitol, hydroquinone, adipic acid, urea, acetamide, erythritol, phthalic anhydride, maleic acid, 2-chlorobenzoic acid, sugars, sugar alcohols, and fatty acids or their derivatives.

Paraffins with chain length of greater than 25 ($C_nH_{2n+2}$, with n>25) have melting points over 125° F. and typically exhibit volumetric expansion of >10%, usually ~15% or even more and can be a preferred PCM for the encapsulated lost circulation material. Paraffin with n=100 (Hectane) for example has a melting temperature of 115° C. or 239° F. Accordingly, depending on the specific application and the desired phase transition temperature, a paraffin with a corresponding chain length can be selected.

PCMs with 10-15% volumetric change can include sugars or sugar alcohols. Examples of sugar and sugar alcohol PCMs include glycerol, xylitol, sorbitol, erythritol, glucose, fructose, isomalt, maltitol, lactitol, xylose-D, xylose-L, d-mannitol, and galactitol.

PCMs can also include hydrates of inorganic salts or hydrates of inorganic hydroxides. These materials can break the shell by exerting pressure on the shell in two unique ways. Like other PCMs, hydrates can expand in volume during PCM phase transition. Unlike other PCMs, hydrates can also release water, which can generate additional pressure on the shell when water transitions to vapor if heated above its boiling point. Examples of the hydrate of inorganic salts or inorganic hydroxides PCMs include barium hydroxide octahydrate, magnesium nitrate hexahydrate, and magnesium chloride hexahydrate. Other examples may include hydrates of salts of I, II, III, IV groups that are halides, nitrates, carbonates, nitrites, sulfates, sulfites, or eutectic mixtures of thereof.

The disintegrating agent can also include compounds that do not expand during phase transition but can undergo thermal decomposition and produce gas molecules leading to a volume expansion. The gas-producing compound can include at least one of an azo compound, an azide compound, or a metal carbonyl. Azo compounds can release nitrogen upon heating, and can be used as a disintegrating agent in the encapsulated lost circulation materials. Examples of azo compounds include azobisisobutyronitrile (AIBN). Organic azide is an organic compound that contains an azide (—$N_3$) functional group. Sodium azide is the inorganic compound with the formula $NaN_3$.

Metal carbonyls are volatile and low-melting compounds of the $M_x(CO)_y$ type that decompose on heating into carbon monoxide and metal. Examples of metal carbonyls include $V(CO)_6$, $Cr(CO)_3$, $Mo(CO)_6$, $W(CO)_6$, $Mn_2(CO)_{10}$, $Tc_2(CO)_{10}$, $Fe(CO)_6$, $Os(CO)_5$, $Os_3(CO)_{12}$, $Rh_2(CO)_8$, $[Rh(CO)_3]_x$, $Rh_6(CO)_8$, $Ir_2(CO)_8$, $Ni(CO)_4$, and $[Pt(CO)_2]_x$.

The encapsulated lost circulation materials can include about 1 to about 75 wt % or about 10 to about 65 wt % of the elastomer and about 1 to about 25 wt % or about 5 to about 15 wt % of the disintegrating agent, each based on a total weight of the encapsulated lost circulation materials.

The shell of the encapsulated lost circulation materials can include natural polymers such as alginate, cellulose, starch, chitosan, dextran sulfate, pectin, xanthan gum, or combinations thereof; or synthetic polymers such as polymethacrylate, polydimethylsiloxane, polystyrene, polyvinyl acetate, polyvinylpyrrolidone, or combinations thereof. The shell can also include inorganic materials such as silica, alumina, titania, sodium silicate, calcium carbonate, or combinations thereof; metallic materials such as nickel, nickel phosphorus, nickel alloys; iron oxides such as magnetite, maghemite, and haematite; oxyhydroxides such as goethite, ferrihydrite, and lepidocrocite; iron salts such as iron carbonates, iron sulfides, and iron carbides; or a combination thereof. The thickness of the shell can be about 5 µm to about 1000 µm or about 10 µm to about 100 µm.

The elastomer can be combined with the disintegrating agent and optionally the swellable filler and encapsulated within a solid shell. The geometric arrangements of the elastomer and the disintegrating agent are not particularly limited. The elastomer together with the optional swellable filler can form an inner core while the disintegrating agent can form an outer core disposed between the inner core and the shell. Alternatively, the disintegrating agent can form an inner core, and the elastomer together with the optional swellable filler if present can form an outer core disposed between the inner core and the shell. In another aspect, the elastomer, the optional swellable filler, and the disintegrating agent can be randomly distributed in a core encapsulated by a shell.

Figure 1:
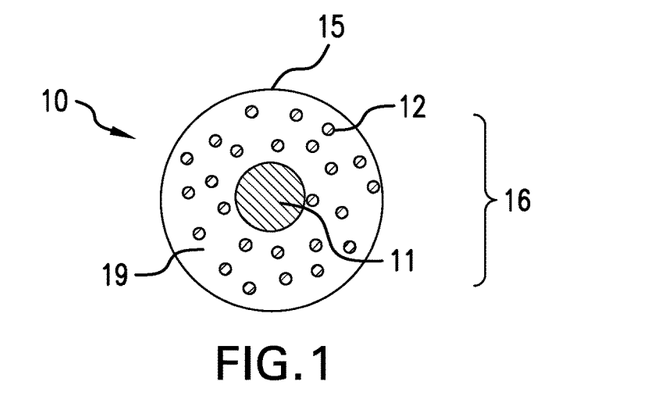
FIG. 1 illustrates an encapsulated lost circulation material comprising a shell, an inner core of an elastomer, and a disintegrating agent disposed in a matrix between the inner core and the shell.

FIG. 1 illustrates an encapsulated lost circulation material (10) comprising a shell (15) encapsulating a core (16), where the core (16) includes an inner core (11) of an elastomer and an optional swellable filler, and a disintegrating agent (12) disposed in a matrix (19) between the inner core (11) and the shell (15).

Figure 2:
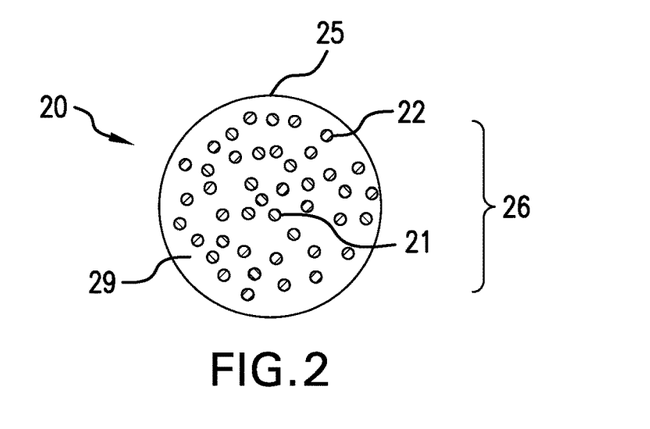
FIG. 2 illustrates an encapsulated lost circulation material comprising an elastomer, and a disintegrating agent disposed in a matrix encapsulated in a shell.

FIG. 2 illustrates an encapsulated lost circulation material (20) comprising a shell (25) encapsulating a core (26), where the core (26) includes an elastomer (21), an optional swellable filler, and a disintegrating agent (22) disposed in a matrix (29) encapsulated in the shell (25).

Figure 3:
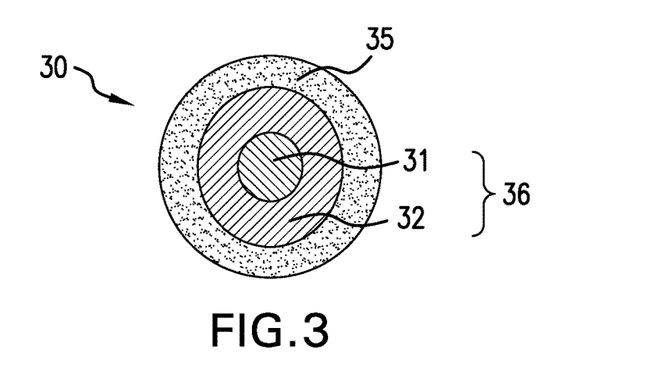
FIG. 3 illustrates an encapsulated lost circulation material comprising a core and a shell encapsulating the core, where the core has an inner core of an elastomer, and an outer core of a disintegrating agent disposed between the inner core and the shell.

FIG. 3 illustrates an encapsulated lost circulation material (30) comprising a core (36) and a shell (35) encapsulating the core (36), where the core (36) has an inner core (31) of an elastomer and an optional swellable filler, and an outer core (32) of a disintegrating agent disposed between the inner core (31) and the shell (35).

As used herein, the matrix is incompressible so that the matrix does not absorb the pressure or force generated by the disintegrating agent upon activation. The matrix can include a matrix material such as organic solvents, water, ionic liquids, crude oils, mineral oils, or a combination comprising at least one of the foregoing.

The composite can further comprise a magnetic material. Suitable magnetic materials can include a paramagnetic material, a superparamagnetic material, or a ferromagnetic material. The magnetic material can be part of the core containing the optionally filled elastomer, and disintegrating agents. The magnetic material can also be included in the shell of the encapsulated lost circulation materials. Illustratively the magnetic material includes but is not limited to iron; nickel; cobalt; ferrite; iron oxides such as magnetite, maghemite, and haematite; oxyhydroxides such as goethite, ferrihydrite, and lepidocrocite; and sulphides such as greigite and pyrrhotite; other iron salts such as iron carbonates, iron sulfides, and iron carbides; or a combination thereof. If present, the encapsulated lost circulation materials can comprise about 0.01 to about 5 wt %, about 0.05 to about 0.5 wt %, or about 0.1 to about 0.2 wt % of a magnetic material, each based on a total weight of the encapsulated lost circulation materials.

Figure 4:
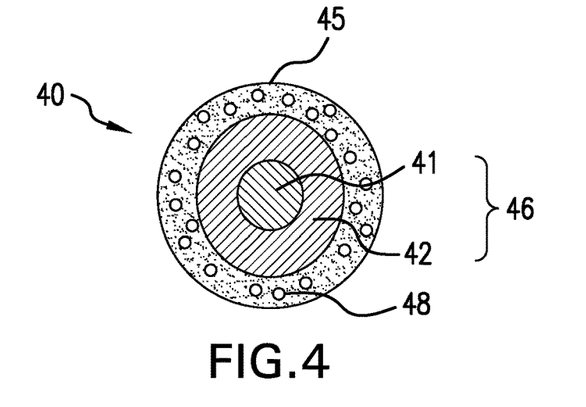
FIG. 4 illustrates an encapsulated lost circulation material comprising a magnetic material disposed in a shell of the encapsulated lost circulation material.

FIG. 4 illustrates an encapsulated lost circulation material (40) comprising a magnetic material (48) included in a shell (45) of the encapsulated composite (40). The encapsulated composite has a core (46), which includes an inner core (41) of an elastomer and an optional swellable filler, and an outer core (42) of a disintegrating agent disposed between the inner core (41) and the shell (45).

Figure 5:
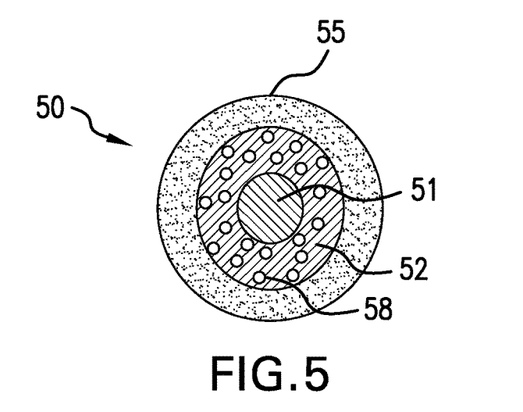
FIG. 5 illustrates an encapsulated lost circulation material comprising a magnetic material disposed in an outer core of a disintegrating agent.

FIG. 5 illustrates an encapsulated lost circulation material (50) comprising a magnetic material (58) disposed in an outer core (52) of a disintegrating agent between an inner core (51) of an elastomer together with an optional swellable filler if present and a shell (55).

Figure 6:
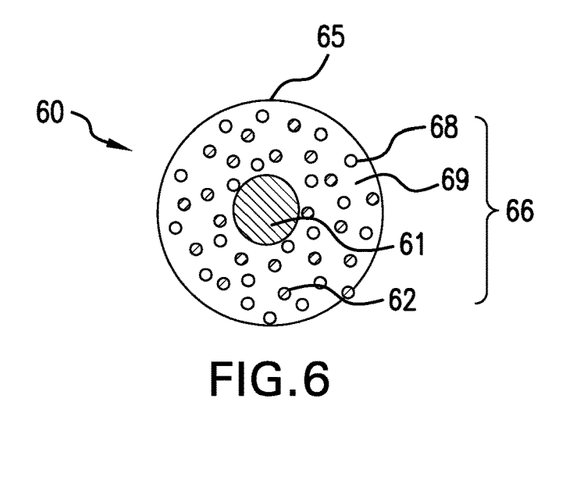
FIG. 6 illustrates an encapsulated lost circulation material comprising a shell, an inner core of an elastomer, and a disintegrating agent and a magnetic material disposed in a matrix between the inner core and the shell.

FIG. 6 illustrates an encapsulated lost circulation material (60) comprising a magnetic material (68) and a disintegrating agent (62) disposed in a matrix (69) between an inner core (61) of an elastomer together with an optional swellable filler if present and a shell (65) encapsulating the core (66).

Figure 7:
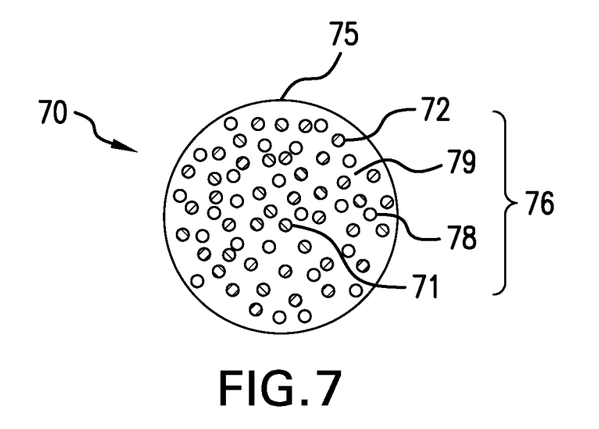
FIG. 7 illustrates an encapsulated lost circulation material comprising a shell encapsulating an elastomer, a disintegrating agent, and a magnetic material disposed in a matrix encapsulated by a shell.

FIG. 7 illustrates an encapsulated lost circulation material (70) comprising a shell (75) encapsulating a core (76) comprising an elastomer (71), an optional swellable filler, a disintegrating agent (72), and a magnetic material (78) disposed in a matrix (79).

The encapsulated lost circulation materials can be present in the form of particles, for example particles having a size from about 0.01 to about 5000 microns (µm), specifically about 0.05 to about 1000 µm, and more specifically about 0.1 to about 500 µm. Further, the encapsulated particles can have any shape including spherical, angular, and polyhedral and are monodisperse or polydisperse with an average particle size distribution that is unimodal or multimodal, e.g., bimodal. As used herein the size of the particles refers to D50 particle size. A D50 particle size can be measured using a laser particle size distribution meter. A D50 particle size refers to a particle diameter corresponding to 50% of the particles by number in a cumulative distribution curve in which particles are accumulated in the order of particle diameter from the smallest particle to the largest particle, and a total number of accumulated particles is 100%.

The encapsulated lost circulation materials as described herein can be manufactured via methods such as physical methods, chemical methods, or physical-chemical methods, for example, those methods as described in Advances in Polymer Technology Volume 2020, Article ID 9490873.

A powder of optionally filled elastomer can be formed from the elastomer and the optional swellable filler. This can be achieved by grinding or by freezing a blend of the elastomer and the swellable filler if present below the glass transition temperature of the elastomer, to a brittle state and crushing the material into a large amount of small particles. For example ball milling of elastomer with swellable filler (frozen below its glass transition) can be used to create small particles.

In physical methods, the formation of the shell only involves physical processes such as drying, dehydration, and adhesion. Examples of physical methods for encapsulating disintegrating agents and the optionally filled elastomer include spray-drying and solvent evaporation. In a spray-drying method, an oil-water emulsion containing the disintegrating agents, the optionally filled elastomers, the optional magnetic materials, the optional matrix materials, and the shell materials can be sprayed in a drying chamber by using an atomizer, drying the sprayed droplets through drying gas stream, and separating the solid particles by cyclone and filter. In a solvent evaporation method, the disintegrating agents, the optionally filled elastomers, the optional magnetic materials, and the optional matrix materials can be added to a polymer solution containing the shell material dissolved in a volatile solvent to form an emulsion, and the shells can be formed on the droplets by evaporating the solvent. The encapsulated lost circulation materials can then be formed through filtration and drying.

Chemical microencapsulation methods utilize polymerization or a condensation process of monomers, oligomers, or prepolymers as raw materials to form shells at an oil-water interface. For example, individual components, e.g., the optionally filled elastomers, the disintegrating agents, the optional magnetic materials, the optional matrix materials, and the resin materials (e.g., monomers and/or oligomers used to form a shell) can be combined in a vessel or reactor to form a reaction mixture, and then agitated to mix components. The reaction mixture can be heated at a temperature or at a pressure commensurate with forming the shell.

Hydrolysis and subsequent condensation can also be used to form inorganic shells. For example, alkoxysilanes or metal oxides can undergo hydrolysis then condensation to form a shell of silica, alumina or titania.

The encapsulated lost circulation materials can be introduced into the subsurface formation through a treatment fluid during a downhole operation such as a drilling operation, a completion operation, or service operation. Accordingly the treatment fluid can be a drilling fluid. As used herein, a drilling fluid includes a drill-in fluid, as the drill-in fluid is a type of drilling fluid designated especially for drilling through the reservoir section of a wellbore. The drilling fluid can be a water or brine-based drilling fluid, an oil or synthetic oil-based drilling fluid, or an invert emulsion based drilling fluid, which has a polar fluid such as water or brine emulsified as the internal phase with a non-polar fluid (oil) as the continuous phase. Other know types of drilling fluids can also be used.

The drilling fluid can contain an encapsulated lost circulation material as described herein; a carrier comprising at least one of water, brine, or an oil; and various additives comprising at least one of viscosifier, a rheology modifier, a dispersant, an emulsifier, a weighting agent, a defoamer, a fluid loss agent, a thickening agent, bentonite, a lubricant, a filler, a surfactant, or a pH buffer. For example, thickening agents like xanthan gum and other polysaccharides and emulsifiers can be included in the drilling fluid to aid in the suspension of drill cuttings. Sized particles that cover a particular range and distribution can be included in the drilling fluid to minimize the fluid loss with the formation of a filter cake. The drilling fluid can also include fillers such as starch and clays to fill the void spaces within the sized particles.

The drilling fluid can have a density of about 8.5 lb/gal to about 20 lb/gal, preferably about 10 lb/gal to about 18 lb/gal, more preferably about 12 lb/gal to about 18 lb/gal.

The treatment fluid can be injected, e.g., pumped and placed by various conventional pumps and tools to any desired location within the wellbore. Once the treatment fluid has been placed in the desired location, the shell can be broken, and the elastomer together with the swellable filler if present can be released from the encapsulated lost circulation materials. The method to trigger the release of the elastomer and the optional swellable filler can include raising the ambient temperature with heat from the formation itself and/or using hot liquid, or steam. When the ambient temperature achieves the phase transition temperature for the phase change material, the phase change material expands exerting pressure on the shell until it breaks thus releasing the elastomer and the optional swellable filler. In the event the disintegrating agent comprises a gas-producing material, the temperature increase can cause the gas-producing material to decompose, producing a gas to break the shell.

The integrity of the shell can also be compromised by ultrasound, chemical degradation, or dissolution in combination with the temperature increase. For the encapsulated lost circulation materials that contain a magnetic material, the temperature of the encapsulated lost circulation materials can be increased by exposing the magnetic material to a thermomagnetic radiation, for example by inducing Eddy current in it, by magnetic induction heating or via a process known as Neel relaxation through the application of the oscillating electromagnetic field on the encapsulated lost circulation materials. The heat produced by the magnetic material can cause the PCMs to expand and/or to cause the gas-producing materials to generate a gas, thus breaking the shell and releasing the optionally filled elastomer. The released optionally filled elastomer can then expand in the presence of a wellbore fluid such as an aqueous based fluid or an oil based fluid, and the expanded elastomer can filling a void or fracture of the subsurface formation to reduce fluid loss. When the core comprises the swellable filler, the swellable filler can also be released from the encapsulated lost circulation material, and the method can further include expanding the swellable filler to form an expanded filler; and filling the void or fracture of the subsurface formation with the expanded filler.

Set forth below are various aspects of the disclosure.

Aspect 1. An encapsulated lost circulation material comprising a particulate having a core comprising an elastomer and a disintegrating agent, and the disintegrating agent comprising at least one of a phase change material or a gas-producing material; and a shell encapsulating the core.

Aspect 2. The encapsulated lost circulation material of any prior aspect, wherein the core comprises the phase change material, the phase change material has a phase transition temperature of about 125° F. (52° C.) and about 1,000° F. (538° C.), and the phase change material has a volumetric expansion of at least 3% during a phase transition relative to a volume of the phase change material before the phase transition.

Aspect 3. The encapsulated lost circulation material of Aspect 2, wherein the core comprises the phase change material, and the phase change material comprises at least one of an inorganic salt, an eutectic mixture of inorganic salts, a metal hydroxide, an eutectic mixture of an inorganic salt with an organic material, a hydrate of an inorganic salt, a hydrate of metal hydroxide, or an organic material.

Aspect 4. The encapsulated lost circulation material of Aspect 1, wherein the core comprises the gas-producing material, and the gas-producing material comprises at least one of an azo compound, an azide compound, or a metal carbonyl.

Aspect 5. The encapsulated lost circulation material as in any prior Aspect, wherein the elastomer is a crosslinked rubber, which comprises a base elastomer crosslinked by a crosslinking agent, and the base elastomer comprises at least one of an ethylene-propylene-diene monomer rubber, a butadiene rubber, a styrene-butadiene rubber, a natural rubber, an acrylonitrile butadiene rubber, a styrene-butadieneacrylonitrile resin, a nitrile butadiene rubber, a hydrogenated nitrile butadiene rubber, a carboxylated nitrile butadiene rubber, a carboxylated hydrogenated nitrile butadiene rubber, an amidated nitrile butadiene rubber, a synthetic polyisoprene rubber, an acrylate-butadiene rubber, a polychloroprene rubber, an acrylate-isoprene rubber, an ethylene-vinyl acetate rubber, a polypropylene oxide rubber, a polypropylene sulfide rubber, a fluorinated polymer rubber, a perfluorocarbon rubber, or a tetrafluoro ethylene propylene rubber.

Aspect 6. The encapsulated lost circulation material as in any prior Aspect, wherein the core further comprises a swellable filler comprising at least one of a partially neutralized polyacrylic acid sodium salt, a crosslinked isoprene-maleic acid salt, a starch-polyacrylic acid salt, a crosslinked carboxylmethyl cellulose, a polyvinyl alcohol-acrylic acid salt, sodium acetate, sodium formate, or sodium acrylate.

Aspect 7. The encapsulated lost circulation material of Aspect 6, where a weight ratio of the elastomer relative to the swellable filler is about 20:1 to about 1:2.

Aspect 8. The encapsulated lost circulation material as in any prior Aspect, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

Aspect 9. The encapsulated lost circulation material as in any prior Aspect, further comprising a magnetic material.

Aspect 10. The encapsulated lost circulation material of Aspect 9, wherein the magnetic material is disposed in the shell of the encapsulated lost circulation material.

Aspect 11. The encapsulated lost circulation material of Aspect 9, wherein the magnetic material is disposed in the core of the encapsulated lost circulation material.

Aspect 12. The encapsulated lost circulation material of Aspect 9, wherein the magnetic material is coated on the disintegrating agent.

Aspect 13. A wellbore fluid comprising a carrier and the encapsulated lost circulation material as in any prior Aspect.

Aspect 14. The wellbore fluid of Aspect 13, wherein the wellbore fluid is a drilling fluid.

Aspect 15. A method of reducing lost circulation, the method comprising: introducing into a subterranean formation a wellbore fluid comprising an encapsulated lost circulation material having a core comprising an elastomer and a disintegrating agent, and the disintegrating agent comprising at least one of the phase change material or a gas-producing material, and a shell encapsulating the core; heating the disintegrating agent to cause the phase change material to expand, or to cause the gas-producing material to produce a gas, or a combination thereof to break the shell; and releasing the elastomer from the encapsulated lost circulation material; expanding the elastomer; and filling a void or fracture of the subterranean formation with the expanded elastomer to reduce fluid loss.

Aspect 16. The method as in any prior Aspect, wherein the core further comprises a swellable filler. The method further comprises releasing the swellable filler from the encapsulated lost circulation material; expanding the swellable filler to form an expanded filler; and filling the void or fracture of the subsurface formation with the expanded filler.

Aspect 17. The method as in any prior Aspect, wherein the wellbore fluid is a drilling fluid.

Aspect 18. The method as in any prior Aspect, wherein the encapsulated lost circulation material further comprises a magnetic material.

Aspect 19. The method of Aspect 18, wherein the method further comprises applying an electromagnetic radiation to the magnetic material to generate heat, and heating the disintegrating agent with the heat generated from the magnetic material.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). In an embodiment, the term "about" means that the value associated with about can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An encapsulated lost circulation material comprising a particulate having
   a core comprising an elastomer and a disintegrating agent, the disintegrating agent comprising a phase change material wherein the phase change material has a phase transition temperature between about 125° F. (52° C.) and about 1,000° F. (538° C.), and has a volumetric expansion of at least 3% during a phase transition relative to a volume of the phase change material before the phase transition; and
   a shell encapsulating the core.

2. The encapsulated lost circulation material of claim 1, wherein the phase change material comprises at least one of an inorganic salt, an eutectic mixture of inorganic salts, a metal hydroxide, an eutectic mixture of an inorganic salt with an organic material, a hydrate of an inorganic salt, a hydrate of metal hydroxide, or an organic material.

3. The encapsulated lost circulation material of claim 1, wherein the elastomer is a crosslinked rubber, which comprises a base elastomer crosslinked by a crosslinking agent, and the base elastomer comprises at least one of an ethylene-propylene-diene monomer rubber, a butadiene rubber, a styrene-butadiene rubber, a natural rubber, an acrylonitrile butadiene rubber, a styrene-butadiene-acrylonitrile resin, a nitrile butadiene rubber, a hydrogenated nitrile butadiene rubber, a carboxylated nitrile butadiene rubber, a carboxylated hydrogenated nitrile butadiene rubber, an amidated nitrile butadiene rubber, a synthetic polyisoprene rubber, an acrylate-butadiene rubber, a polychloroprene rubber, an acrylate-isoprene rubber, an ethylene-vinyl acetate rubber, a polypropylene oxide rubber, a polypropylene sulfide rubber, a fluorinated polymer rubber, a perfluorocarbon rubber, or a tetrafluoro ethylene propylene rubber.

4. The encapsulated lost circulation material of claim 1, wherein the core further comprises a swellable filler comprising at least one of polyacrylic acid, a partially neutralized polyacrylic acid sodium salt, poly(butyl acrylate), a crosslinked isoprene-maleic acid salt, a starch-polyacrylic acid salt, a crosslinked carboxylmethyl cellulose, a cellulose, a cellulose nanocrystal, a polyvinyl alcohol-acrylic acid salt, a poly(ethylene oxide), a polyacrylamide, sodium acetate, sodium formate, or sodium acrylate.

5. The encapsulated lost circulation material of claim 4, where a weight ratio of the elastomer relative to the swellable filler is about 20:1 to about 1:2.

6. The encapsulated lost circulation material of claim 1, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

7. The encapsulated lost circulation material of claim 1, further comprising a magnetic material.

8. The encapsulated lost circulation material of claim 7, wherein the magnetic material is disposed in the core of the encapsulated lost circulation material.

9. A wellbore fluid comprising a carrier and the encapsulated lost circulation material of claim 1.

10. The wellbore fluid of claim 9, wherein the wellbore fluid is a drilling fluid.

\* \* \* \* \*

UNITED STATES PATENT AND TRADEMARK OFFICE
CERTIFICATE OF CORRECTION

| | | |
|---|---|---|
| PATENT NO. | : 12,258,822 B2 | Page 1 of 1 |
| APPLICATION NO. | : 18/449389 | |
| DATED | : March 25, 2025 | |
| INVENTOR(S) | : Rostyslav Dolog et al. | |

It is certified that error appears in the above-identified patent and that said Letters Patent is hereby corrected as shown below:

On the Title Page

Item [*], should read: This patent is subject to a terminal disclaimer.

Signed and Sealed this
Fifteenth Day of April, 2025

Coke Morgan Stewart
*Acting Director of the United States Patent and Trademark Office*